United States Patent [19]
Sundberg

[11] 3,899,358
[45] Aug. 12, 1975

[54] FILTER CAP FOR STORAGE BATTERIES

[75] Inventor: Erik G. Sundberg, Stockholm, Sweden

[73] Assignee: Aktiebolaget Tudor, Stockholm, Sweden

[22] Filed: Apr. 12, 1973

[21] Appl. No.: 350,654

[52] U.S. Cl. .............. 136/179; 136/177; 136/163
[51] Int. Cl. .......................................... H01m 1/06
[58] Field of Search .......... 136/163, 177, 178, 179; 220/44 A, 44 C

[56] References Cited
UNITED STATES PATENTS

| 1,363,648 | 12/1920 | Hubbard | 136/177 |
| 1,920,261 | 8/1933 | Lavender | 136/177 |
| 2,615,062 | 10/1952 | Craig | 136/179 |

FOREIGN PATENTS OR APPLICATIONS

| 877,220 | 5/1959 | United Kingdom | 136/179 |

Primary Examiner—Winston A. Douglas
Assistant Examiner—John F. Niebling
Attorney, Agent, or Firm—Burns, Doane, Swecker & Mathis

[57] ABSTRACT

Filter cap for a storage battery of the type which gives off gases during its work cycle. The filter cap separates droplets of liquid from the gases and allows the droplets to return to the battery. The filter section comprises substantially vertical walls of microporous material that are separated to provide passageways for the released gases.

9 Claims, 6 Drawing Figures

PATENTED AUG 1 2 1975　　　　　　　　　　　　　　3,899,358

FILTER CAP FOR STORAGE BATTERIES

The present invention relates to a closure plug or filter cap for those electric storage batteries that at some point in their work cycle give off gases, and in connection therewith, possibly drops of electrolyte. The most usual type of such storage batteries is the lead-acid storage battery.

When a lead-acid storage battery is charged, under certain circumstances there can be production of gas, whereby hydrogen is developed at the negative electrode and oxygen at the positive electrode. The conditions under which gas is produced generally occur during charging, though there is some formation of gas because of self-discharging even when the cells are not functioning. In addition, gas formed during charging is sometimes released in connection with the gas formed during discharge or rest. The gases thus developed must be allowed to leave the battery, and this is generally effected through the opening that is used for putting in the liquid electrolyte. In this opening, it is customary to use a cap with small vents so that gas may escape. The gas entrains droplets of electrolyte. It is desired that these droplets be separated from the gases and returned to the battery. The present invention relates to a filter cap that especially meets this requirement.

Although the invention, both above and in the following discussion, is described in terms of lead-acid storage batteries, it can be applied for any kind of storage battery that needs such ventilation. There would only need to be adaptation of the invention by selection of suitable material, resistant to the electrolyte and gases that develop, without being destroyed.

In the past, various attempts have been made to provide a filter cap that satisfactorily separates and returns the droplets of acid without preventing passage of the gas. One simple means previously used was to make the filter cap in the form of a hollow cylinder with small holes in the upper and lower circular faces. The interior of the cylinder was filled with small balls made of a material such as plastic or glass. The droplets of electrolyte condensed on the balls and collected to form larger drops which then trickled back down into the cell. While this construction is simple and functions reasonably well, its efficiency is less than is needed in certain applications in that some of the electrolyte passes through the cap without being caught, and during periods of strong overcharging, the cap has become saturated with electrolyte.

Other prior attempts have involved the use of labyrinths, either alone or in combination with valve arrangements, such for example as is described in British Pat. No. 836,944. Still another attempt involved the use of a microporous plate through which all gas is to pass before it leaves the battery, as is described in U.S. Pat. No. 3,466,199. The risk of clogging such a plate by overloading with the liquid electrolyte is very high, and therefore the patent includes descriptions of various arrangements that can be undertaken to prevent the electrolyte from coming near the plate in excessive amounts.

It is an object of the present invention to provide a novel filter cap characterized in that the gas, as it is liberated from the battery, must pass through passageways with microporous vertical walls. In this way, there is a very good liquid collecting effect because the droplets coming into contact with the walls are immediately trapped by them.

A further object is to provide an improved filter cap of the foregoing type where the passageways between the vertical walls contain barriers which deflect the movement of the liberated gas from a straight vertical pass to thus enhance the efficiency of the filter.

A still further object is to provide a novel two-section filter arrangement in a filter cap wherein the lower section removes the larger droplets and gas thereafter passes into the novel filter arrangement of the present invention to thus enable the removal of substantially all electrolyte vapor carried by the liberated gas.

These and other objects of the invention will become more fully apparent from the claims, and from the description as it proceeds in connection with the appended drawings wherein:

Figure 1:
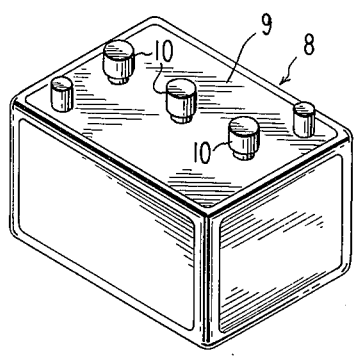
FIG. 1 is a pictorial view of a battery having the filter caps of the present invention.

Referring to the drawings, FIG. 1 shows a battery 8 which has three cells, each of which has a separate electrolyte filler opening in cover 9. A separate filter cap 10 is placed in each of the openings in cover 9.

Figure 2:
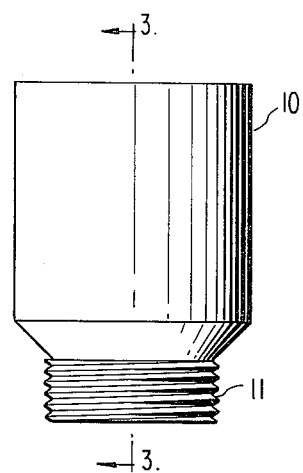
FIG. 2 is an external elevation to an enlarged scale of the filter cap according to the invention.

The filter cap 10 may be formed to have a cylindrical housing, as shown in FIG. 2, and a threaded neck 11 at the lower end to engage the threads usually provided in the battery cover. The upper end of the cylindrical housing may be closed by a disc 12 which carries a downwardly depending post 14. Disc 12 is made of a material which prevents a pressure build-up inside of cap 10, but at the same time prevents foreign material from entering the battery by reverse direction flow.

Figure 3:
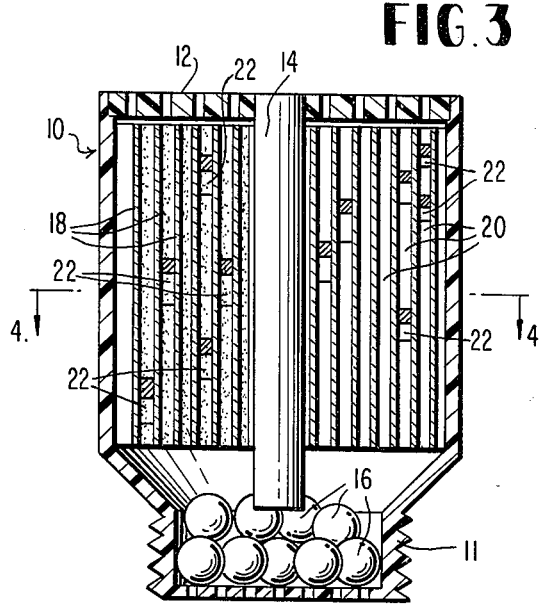
FIG. 3 is an elevation in section taken along lines 3—3 of FIG. 2.

At the lower end of the cylindrical housing inside the threaded portion 11, space is provided in which a first filter section may be installed which is effective for trapping large liquid droplets to thus reduce the loading on the second filter section to be described below. The first filter section may be of any known type, such for example as balls 16, as illustrated in FIG. 3.

The novel filter section of the present invention is composed of a plurality of substantially vertical walls 18 of a microporous material that are closely spaced so that vertical passageways 20 are provided through the upper portion of the filter cap 10. By making the vertical length of walls 18 sufficiently extensive, it is not necessary to use the lower section filter balls 16, as illustrated in FIG. 3.

Figure 4:
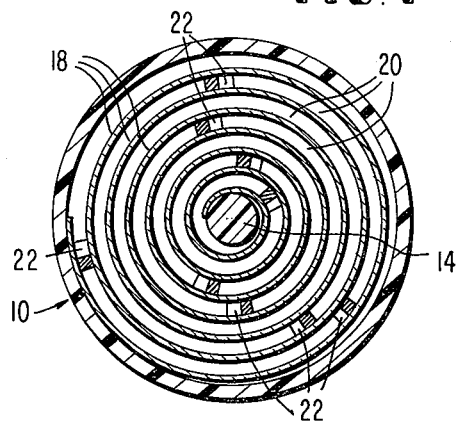
FIG. 4 is a plan view in section taken along lines 4—4 of FIG. 3.
Figure 5:
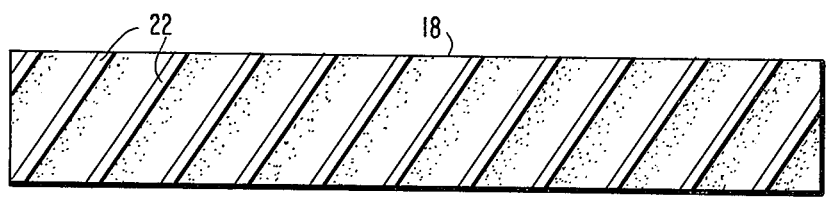
FIG. 5 is a view of the microporous material in a laid-out form before it is rolled up and placed in the housing of the filter cap.
Figure 6:
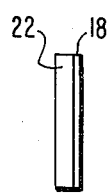
FIG. 6 is an end view of the microporous material shown in FIG. 5.

In FIG. 4, there is illustrated an embodiment wherein the vertical walls 18 are formed by winding a single strip of material, see FIGS. 5 and 6, into the form of a spiral. One end of the spiral is connected to core 14 and the other end of the spiral extends to the inside wall surface of the filter cap 10.

In FIGS. 5 and 6, the sheet of material 18 which forms the vertical walls is shown to a reduced scale. On one surface of the sheet 18 of microporous material, a plurality of barriers 22 which extend in a plane perpendicular to the surface of sheet 18 may be provided. These barriers are set at a slant so that when the sheet 18 is wrapped into a spiral, it is not possible to draw a straight line perpendicularly through the spiral without intersecting at least one of the barriers 22. The height of the barriers 22 should be such that when the spiral is wound, the barriers extend across the entire passageway to engage the back surface of the adjacent vertical wall 18, as shown in FIGS. 3 and 4. Only a few randomly selected barriers are shown in the interest of clarity and to avoid unnecessary complication of the drawings. Barriers 22 may be made of the same microporous material as sheet 18 so that they may themselves serve as a filtering material, or be of any other material to merely deflect the gas as it progresses upwardly through the passageways 20.

The microporous structure of the walls 18 allows heavy liquid loading and the substantially vertical orientation prevents overloading. The microporous material in sheet 18 can advantageously be hydrophilic, which increases markedly the capacity. If deemed desirable, the hydrophilic material can be treated to a greater or lesser degree so that it is hydrophobic. For such treatment, application of a thin layer of polytetrafluorethylene may be used, for example.

In the construction of the filter cap 10, the hollow outer cylindrical casing which is used to house the microporous material may be so arranged that the thin plate of microporous material may be rolled around the core 14 as a spiral and placed as an insert in the cylinder. To ensure that each liquid droplet will come into contact with the microporous walls, slanted barriers 22 may be disposed in the passageways between the spirals, thereby forcing the gas to deviate from a vertical straight path of movement through the filter cap. If the barriers 22 are of the same microporous material as the walls, the effiency is further increased since the possibilities of catching every individual droplet are further enhanced.

A filter cap made as described above has a very good capability of separating drops entrained by the gas liberated by a battery. Since the gas passes through entirely open passageways, the pressure drop over the filter cap is very small, and the flow of gas is essentially unimpeded. Because of the vertical disposition of the walls, the liquid taken up in the walls or on the wall surfaces runs downward in the filter cap to drop from the bottom of the microporous material and is returned to the cell.

Even though filter caps according to the invention are capable of taking up large quantities of liquid, there is still some risk of overloading under certain circumstances. To reduce this risk and also allow for a shorter filter cap, the plug can be furnished at its lowermost part with a known form of coarse separating device that catches the biggest liquid droplets and keeps them from coming into contact with the microporous material. An appropriate way to do this is to use a relatively thin layer of small balls 16, as shown in FIG. 3, which are located at the bottom of the plug beneath the microporous filters of the present invention.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be covered by Letters Patent is:

1. In combination with a storage battery in which gas is liberated during its normal use and having openings in the cover thereof, a filter cap for a cover opening, said filter cap comprising a housing with a lower end adapted to fit with a gas tight seal in the cover opening and an upper wall with vent openings, a plurality of substantially vertical walls of a microporous material in the space between the lower end and the upper wall, the space between said adjacent vertical walls forming passageways for the gas liberated from the battery, and slanted barrier means in said passageways comprising a plurality of members which extend across the sheet material at an angle relative to the vertical direction and which have a height such that when the spiral is wound, the members extend across the entire passageways.

2. The combination of claim 1 characterized in that the microporous walls are hydrophilic.

3. The combination of claim 2 characterized in that the surfaces of the microporous walls that face the gas passages are made entirely or partly hydrophobic.

4. The combination of claim 1 characterized in that the barrier means comprise a plurality of layers of material which extend across the space forming the passageways between adjacent vertical walls of microporous material.

5. The combination of claim 4 wherein the layers of material forming said barrier means are microporous and further having means at the lower end for trapping large liquid droplets before the liberated gas comes into contact with the microporous surfaces.

6. The combination of claim 1 characterized in that the surfaces of the microporous walls that face the gas passages are made entirely or partly hydrophobic.

7. The combination of claim 4 further including a central post secured at its upper end to said upper wall, and wherein said vertical walls of microporous material are the walls of strip of said microporous material rolled into the shape of a spiral having its inner end secured to said control post and its outer end to housing side walls.

8. The combination of claim 2 wherein said microporous material forming said vertical walls is comprises a unitary sheet wound in the form of a spiral.

9. The combination of claim 1 together with means at the lower end for trapping large liquid droplets before the liberated gas comes into contact with the microporous surfaces.

* * * * *